United States Patent Office 3,331,664
Patented July 18, 1967

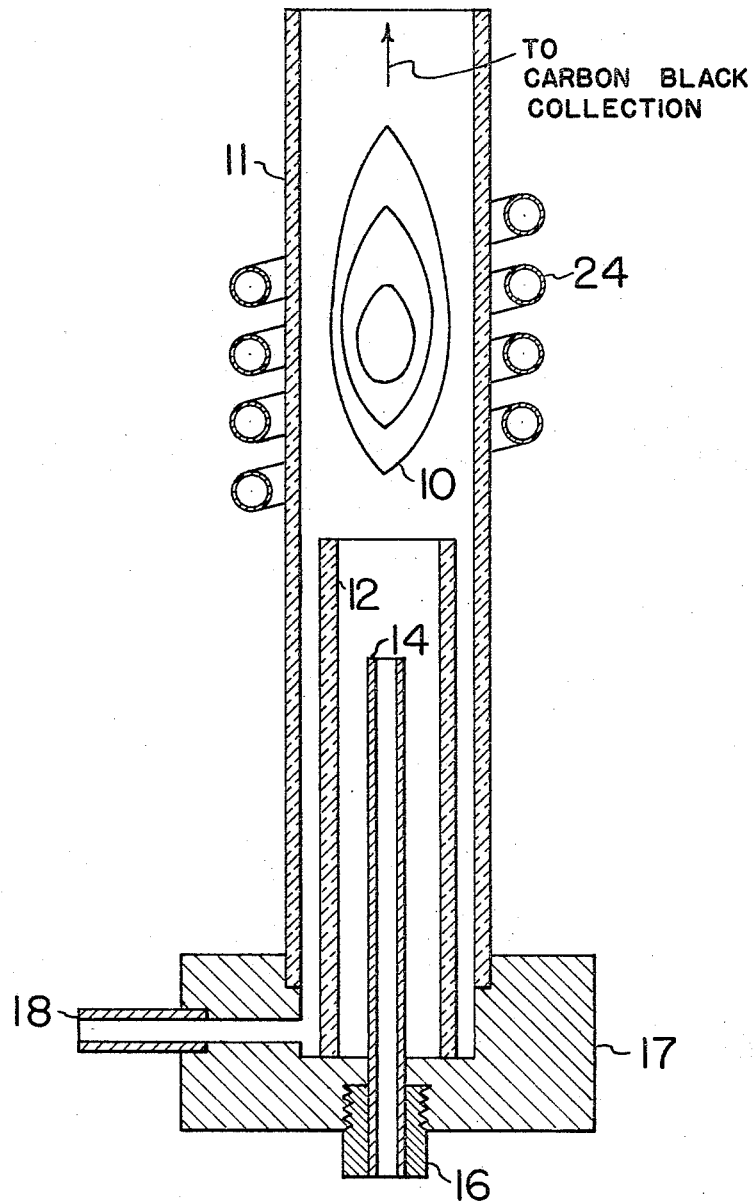

3,331,664
METHOD FOR PRODUCING CARBON BLACK
Merrill E. Jordan, Walpole, Mass., assignor to Cabot Corporation, Boston, Mass., a corporation of Delaware
Filed Mar. 2, 1964, Ser. No. 348,674
7 Claims. (Cl. 23—209.3)

ABSTRACT OF THE DISCLOSURE

A process for making carbon black, and most notably carbon blacks having very low Lc crystallite dimensions, by forming a high-temperature thermal plasma reaction zone comprising ionized gas and feeding into this zone a halogenated carbon compound such as carbon tetrachloride or the like. The preferred gases ionized to form the plasma are monatomic inert gases such as argon.

---

This invention relates to carbon black. More precisely, the invention disclosed herein relates to a method for producing unusual carbon blacks at extremely high temperatures and to the novel carbon products resulting therefrom.

Commercially carbon black is produced by the thermal decomposition of carbon containing materials which are usually essentially hydrocarbon in nature. The thermal decomposition of the carbonaceous material can be achieved by various processes such as open flame decomposition (impingement or channel), enclosed direct flame decomposition (furnace), externally heated surfaces (continuous thermal) or detonation or internal combustion processes (engine or energy utilizing systems), etc. In the above-mentioned processes, the decomposition temperatures involved usually do not exceed about 3000° F. The basic physical properties of a black, and, therefore, the performance characteristics exhibited thereby in the applications therefor, are determined in large measure by the particular process by which it is produced. For example, channel blacks or impingement type blacks which are produced in the presence of air at temperatures of about 1000° F. are generally characterized by high surface area, low structure, high volatile content and low pH, and are particularly suitable for use as coloring agents, and as reinforcing agents in natural rubber. On the other hand, carbon blacks, produced in an enclosed conversion zone at temperature of about 2500° F. e.g. by the furnace process may be produced over a wide range of closely controlled particle sizes and accordingly, are adaptable as fillers for various synthetic rubbers and plastics.

It is to be noted, however, that the differences in properties of the above-mentioned blacks which are generally attributable to the process involved in their production largely reside in differences in physical properties such as particle diameter, structure, surface area, etc. In turn some of the physical properties such as surface area, etc. also have some bearing on chemical properties such as pH, etc. However, despite differences in physical and chemical properties, it is generally conceded by those skilled in the art that all known carbon blacks are composed of basic units all of which have essentially the same dimensions and arrangement. For example, it is well known that all carbon black particles are composed of relatively flat layers or bundles of basic units or platelets which exhibit the outline or shape of cyclic rings of carbon atoms and similar structures. However, unlike graphite or graphitized carbon blacks, e.g. those which have been heated in the absence of air to temperatures above about 2700° C., the arrangement of these units or platelets within carbon black particles lacks any definite crystallite order. This type of arrangement of the basic units is generally defined as "quasi crystalline" or "turbostratic" arrangement and characterizes the arrangement of the basic units of all known blacks. For example, X-ray diffraction patterns of known blacks are characterized by two well developed peaks, e.g. 002 and 10, which differ somewhat in intensity within a rather limited range. From these peaks, the La and Lc peak dimensions may be calculated for any black. The La peak dimension is a measure of the average diameter of the crystallite of the black while the Lc is a measure of the average thickness thereof and is also an indication of the orderliness in which the platelets comprising the black are arranged. Thus, although carbon blacks are not considered crystalline in the ordinary sense, nevertheless there is still sufficient order within the units comprising blacks that the arrangement may be detected by X-ray examination. Hence all blacks manifest similar basic morphological properties and this morphology although essentially turbostratic nevertheless is orderly enough that Lc dimensions may be obtained for any known black.

In view of the many well known applications for carbon blacks as finely divided inert fillers and/or pigments, it will be obvious that any process which can insure the uniform production of novel carbon blacks composed of basic units in an unusual morphological arrangement or any process which can selectively and precisely adjust the morphological arrangement of carbon blacks by a predetermined degree would be a notable contribution to the art.

The principal object of the present invention is to provide a carbon product the basic units of which have a new and unusual morphological arrangement which imparts to the black a highly amorphous character.

Another object of the present invention is to provide a process for selectively and precisely producing carbon blacks or pigments of unusual morphological properties which have been altered to a predetermined degree.

Other objects of the present invention will in part be obvious and will in part appear hereinafter.

The above objects and advantages are obtained in accordance with the teachings of our invention essentially by decomposing a halogenated carbon compound in the presence of an ionized monatomic or diatomic gas at substantially atmospheric pressure or above. More precisely, the objects and advantages of our invention are realized by continually introducing a completely substituted halogenated carbon compound into a zone wherein preferably a monatomic gas is subjected to sufficient electrical energy to maintain the monatomic gas in a thermal plasma state. In accordance with the especially preferred embodiment of our invention we have produced carbon blacks which are completely amorphous and in another aspect thereof we have been able to selectively and precisely adjust the order of the units of blacks by a predetermined degree.

For the purposes of the present invention the term, "thermal plasma state" means that state obtained when a monatomic gas, such as helium, neon, xenon, radon and most preferably argon, or a diatomic gas is introduced to a zone at a pressure of about one atmosphere or higher and subjected to sufficient high frequency current in the zone so that from about 10 to about 50% of atoms therein are ionized. When monatomic gases such as those described above exist in the thermal plasma state, temperatures ranging from about 10,300° F. to about 40,000° F. or somewhat higher are established. Accordingly, the thermal plasma state is to be contrasted with conventional plasmas which are encountered in neon lights, etc. essentially by the higher pressure and extremely high temperatures involved in the thermal type plasma.

Many manners are known whereby monatomic or diatomic gases may be ionized to maintain same in the thermal plasma state. For example, the best known method of producing such a plasma is that wherein an A.C. or D.C. current of many thousands of amperes is passed through a monatomic or diatomic gas occupying a region between two electrodes. Another method of producing a thermal plasma involves the use of the electrode type plasma torch in which the gas is passed around one of the electrodes and then permitted to pass through a hole in the second electrode thereby producing a plasma which may be directed outside the electrode zone. We have found that the most advantageous method of establishing the plasma state for the purposes of our invention is best obtained by an electrodeless discharge technique. In accordance with this technique, a finite zone is established within the confines of the reactor wherein the monatomic gas, upon passing therethrough, will exist in the thermal plasma state. By adjusting and maintaining the flow rate of the gas and the input of power, the size of the zone wherein the gas exists in the plasma state may be modified and/or enlarged so that it effectively occupies a cross-sectional portion of the reactor. Thus, the thermal plasma state is established and maintained at a precise location in the reactor, and halogenated carbon compounds may be introduced directly thereto in a manner which insures the best contact conditions between the halogenated carbon compound and the high energy, thermal plasma. This preferred method of producing the thermal plasma state will be discussed and described in more detail hereinafter.

Other critical features of our invention in addition to the high temperature decomposition temperatures utilized are the nature of the fuel involved and the exclusion of substantial amounts of oxygen and other such oxidants from the reaction zone. We have discovered that completely amorphous carbon blacks are produced when carbon tetrachloride and other such completely halogenated carbon compounds are decomposed in the plasma zone. Accordingly, the raw materials for the practice of our invention are those compounds which consist essentially of carbon and halogens, which are gaseous or liquid or otherwise suspendable or dispersible in the inert ingredients which are conveyed to the plasma zone. Such feed stocks include many of the completely halogenated substituted alkyl or aryl compounds such as carbon tetrachloride, hexachloroethane, hexachlorobenzene and their bromo, fluoro and iodo counterparts.

Our invention and especially the manner of practicing same will be better understood by reference to the drawing which illustrates an arrangement of apparatus, suitable for practicing our invention.

Referring now to the drawing, the apparatus illustrated therein comprises a localized reaction zone which for the purposes of conducting small scale operations may be enclosed by a quartz tube of almost any desired I.D. such as from about 25 mm. to about 40 mm. or even somewhat larger. In larger scale production, the reaction zone may be surrounded by other refractory type materials with the choice of the particular material depending in large measure upon the temperatures encountered at the walls of the reaction zone and upon the ability of the material to permit effective transfer of sufficient energy to ionize the gas. Axially aligned within the localized reaction zone 10 and, more precisely leading concentrically to the lower portion thereof is a tube 12 of smaller outside diameter than the internal diameter of tube 11. Tube 12 which is preferably of quartz or other high temperature resistant materials should be of sufficient outside diameter and be fixed concentrically within tube 11 so as to provide an annular space between the inner walls of tube 11 and the outer walls of tube 12. Concentrically positioned within tube 12 is tube 14 which generally terminates short of the upper end of tube 12 and is of considerably smaller diameter than tube 12. Tube 14 which may be of metal extends through the base of the apparatus 17 and communicates in air tight fashion with halogenated hydrocarbon feed line 16. When tube 14 is of metal, means for raising and lowering the tube in the reaction zone should preferably be provided. Tube 18 introduces the gas preferably tangentially to the lower portion of the space formed between tubes 10 and 12. The gas thus moves upwardly through the space and upon passing from this space continues upwardly in a generally spiralling direction through tube 11 with the greater portion thereof remaining in close proximity to the inner walls of tube 11. In this manner a low pressure area is created in the center and aids in stabilizing the plasma and permits a greater portion of the halogenated fuel to be fed into the central regions of tube 11. Positioned above tube 12 and about the outer walls of tube 11 is a cylindrical coil 24 which is generally of copper and preferably hollow to permit cooling liquid to flow therethrough. The coil 24 in the illustrated apparatus may consist of from about 4 to about 7 or 8 turns or more depending upon the size and shape of the reaction zone and the flow of high frequency current needed therefor. For example, when a diatomic gas is ionized, greater energy is required to first dissociate the gas and then ionize the dissociated particles. Less energy is required for the monatomic gases which although they have higher ionization temperatures nevertheless do not dissociate but rather are ionized directly. The coil is connected to a source of high frequency current, e.g. a generator (not shown). Generally, current frequencies of about 3 to 5 megacycles are sufficient for accomplishing suitable results with monatomic gases in the apparatus illustrated.

In the operation of the described apparatus, the gas, generally argon, is fed tangentially under suitable positive pressure (generally greater than about 1 atmosphere) into the space between the outer walls of tube 12 and the inner walls of tube 10. When the desired flow rate is attained, the high frequency current is supplied to coil 24. If tube 14 is of metal, then it may be raised into the area of the coil 24 and will be heated therein by the high frequency field. In turn, the heated metal heats the gas around it making the gas more conductive and concentrating the field. The heat is sufficient to create a localized plasma which in turn almost immediately raises the temperature of the gas within the reaction zone to ionizing temperatures thereby establishing a thermal plasma within the coil area. An alternative method for starting the plasma involves placing a tantalum wire or a wire of any other metal or carbon rod in the center of the coil 24 and withdrawing same after the plasma has been initiated. After the plasma is established in the reaction zone, tube 14 is located in approximately the position shown in the drawing. Thereafter, a fluid chlorinated hydrocarbon is fed through tube 14 into the plasma zone at the desired feed rate. Almost all of the chlorinated hydrocarbon passes through the central portions of the plasma because of the vortex created by the preferred manner of introducing argon to the reaction zone.

We are unable to explain precisely why the morphology of the blacks produced in accordance with our discovery is altered or in many cases completely different from that of known blacks. However, we postulate—but we prefer not to be bound by this explanation—that the halogen-containing fuel is completely dissociated in passing through the plasma zone. As stated, the environment of the plasma zone is characterized primarily by the existence therein of the highly energized ionized particles which upon recombination produce extremely high temperatures. These temperatures may range from about 10,300° F. to 40,000° F. or even somewhat higher in the various regions of the zone. Thus, the dissociation products upon recombination encounter conditions which are far beyond those barriers which define conventional carbon forming processes. We believe that these usual environmental conditions, the halogen impedes the orderly quasi crystallite growth of the blacks basic units. We further believe that the effectiveness of the halogen in impeding crystalline growth is assured when substantial amounts of other elements such as oxygen, sulfur and especially hydrogen are excluded from the plasma reaction zone. It should be pointed out that the production of carbon in the absence of hydrogen is completely surprising in view of the state of the art since many current theories of carbon black formation regard hydrogen as an essential ingredient for the formation of carbon.

In order that those well skilled in the art may better understand and practice our invention, the following illustrative examples are presented. In each of the following examples, apparatus similar to that set forth in the drawing was utilized. A 20 kw. Lepel high frequency converter was used to supply power through a 7 turn copper coil—24 of the drawing—of ¼" O.D. copper tubing surrounding a 40 mm. O.D. silica tube—10 of the drawing. A 3" diameter Pyrex tube was suspended above the quartz tube with a ¼" vertical separation. In turn the Pyrex tube was attached to the Pyrex cyclones and collectors and finally a bag filter. The flow of gases and collection of carbon was directed through the vertical collector cyclones and the bag by means of a blower providing approximately 10 cm. $H_2O$ reduced pressure thereto. These monitomic gas in all cases was argon and the argon was introduced to the quartz tube tangentially by means of the tube similar to tube 18 of the drawing. The breakdown potential of the argon flowing through the energized zone—22 of the drawing—was lowered by introducing a conducting wire thereto through the vertical separation between the quartz and Pyrex tubes. With the introduction of the wire, the argon ionizes and couples, thereby setting up a thermal plasma zone in the quartz tube. The wire was then removed. The halocarbon fuel was introduced to the plasma zone separately from the argon by means of a tube similar to tube 16 of the drawing.

Example 1

In apparatus similar to that described above, argon was introduced continually to the silica tube tangentially at a rate of about 20–30 ft.³/hr. After establishing a thermal plasma zone with the confines of the tube, butene-1 was introduced to the zone continually at a rate of about 0.25 ft.³/hr. The run continued for 2 hours. At the conclusion of the run, 16.5 grams of carbon black were recovered from the collection system.

The black produced was evaluated and found to have the following properties:

Run No. PB–21:
  $N_2$ surface area (m.²/gram) _____ 91.5
  Electron microscope particle diameter, millimicrons _____ 37
  Oil adsorption (cc./gram) _____ 1.82
  Scale _____ 87

The X-ray diffraction patterns of the black obtained from Run PB–21 revealed no trace of graphitization and that the L$a$ dimension was 51 angstroms was calculated from the 10 peak while the L$c$ dimension was 37 angstroms as calculated from the 002 peak.

Example 2

Substantially the same procedure as described in Example 1 was followed but in the present run, instead of butene-1, carbon tetrachloride was introduced to the plasma zone at the rate of about 1 cc. per minute by means of an atomizer. The run continued for about 125 minutes. At the conclusion of the run, 9 grams of carbon black were recovered from the collection system. The properties of the black were evaluated and found to be as follows:

Run No. PB–104:
  $N_2$ surface area (m.²/gram) _____ 204
  Electron microscope particle diameter, millimicrons _____ 36
  Oil adsorption (cc./gram) _____ 0.99
  Scale _____ 77

The X-ray diffraction pattern of the black obtained from Run PB–104 shows a lack of modulations in the 10 peak indicating that the black has no trace of graphitization. The L$a$ dimension was 47 angstroms as calculated from the 10 peak. However, no reliable I$c$ dimension could be calculated since the 002 peak was insignificant.

Example 3

Substantially the same procedure as described in Example 2 is followed but in the present run instead of carbon tetrachloride, dichloro-difluoro-methane is introduced to the plasma zone at the rate of about 0.25 cubic feet/hour. The run is continued for about 100 minutes. At the conclusion of the run an X-ray diffraction pattern of the black collected to substantially similar to that obtained for black PB–104 produced in Example 2.

Since the essence of my invention resides in the discovery that a completely amorphous carbon black may be obtained by decomposing a completely halogenated substituted hydrocarbon in a thermal plasma reaction zone, many modifications in the incidental details offered for the purposes of illustrating my invention may be introduced thereto without departing from the spirit and scope thereof.

Having described my invention what I declare as new and desire to secure by U.S. Letters Patent is as follows:
1. A process for making carbon black comprising:
   (a) electrically inducing heating of a stream of an inert gas to a thermal plasma state of at least about one atmosphere pressure wherein from about 10 to about 50% of said gas is in an ionized state, thereby forming a zone suitable for carrying out high temperature reactions and
   (b) continuously feeding a halogenated carbon compound into said zone, thereby causing the decomposition of said compound to form carbon black.
2. The process of claim 1 wherein the said halogenated carbon compound is carbon tetrachloride.
3. The process of claim 1 wherein the said inert gas is introduced selectively to the peripheral regions of said conversion zone.
4. The process of claim 3 wherein the said gas is an inert monatomic gas.
5. A process for producing carbon black comprising the steps of:
   (a) continually introducing an inert gas tangentially to the inner peripheral regions of an enclosed electrodeless zone at a rate sufficient to establish a pressure of said gas of at least about 1 atmosphere in said zone,
   (b) continually conducting about the outer peripheral boundaries of said zone a radio frequency current sufficient to heat said gas to the ionization temperatures thereof thereby maintaining said gas in a thermal plasma; about 10% to about 50% of said gas being in an ionized state, (c) introducing a completely substituted halogenated hydrocarbon fuel to the central portions of said zone, and (d) collecting the carbon black produced.

6. The process of claim 5 wherein the said fuel is carbon tetrachloride.

7. The process of claim 5 wherein the said gas is a monatomic gas.

References Cited

UNITED STATES PATENTS

| | | | |
|---|---|---|---|
| 2,919,370 | 12/1959 | Giannini et al. | 313—231 |
| 3,009,783 | 11/1961 | Sheer et al. | 23—209.3 |

OSCAR R. VERTIZ, Primary Examiner.

E. J. MEROS, Examiner.